(12) United States Patent
George

(10) Patent No.: US 6,594,358 B1
(45) Date of Patent: Jul. 15, 2003

(54) METHOD AND APPARATUS FOR REPLACING TERMINATOR IN THE BACKPLANE OF A TELECOMMUNICATION SWITCH

(75) Inventor: Frederick E. George, Thornton, CO (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/468,657

(22) Filed: Dec. 21, 1999

(51) Int. Cl.$^7$ ................................................ H04M 3/08
(52) U.S. Cl. ..................... 379/325; 379/19.06; 370/217
(58) Field of Search ........................... 379/325, 2, 9.06, 379/26.01; 370/217, 241, 244; 714/43

(56) References Cited

U.S. PATENT DOCUMENTS 5,321,394 A * 6/1994 Carlton et al. .............. 370/220

* cited by examiner

Primary Examiner—Forester W. Isen
Assistant Examiner—Daniel Swerdlow

(57) ABSTRACT

This invention provides a method for replacing terminators in a backplane of a telecommunication switch such that the telecommunication traffic carried on a line does not require a separate routing of the traffic by the switch operator to another line card. Using this methodology, a switch operator may save a significant amount of time when a terminator needs to be replaced due to routine maintenance or becomes faulty and has outlived its useful life. The telecommunication traffic carried by the line card is typically switched to protected mode status prior to replacing the terminator on the front side of the backplane. A terminator having a mirror image of electronic circuitry of the terminator being replaced is attached to pins located on the rear side of the backplane. The line card is removed and the terminator on the front side of the backplane is replaced. The line card is inserted back into the slot in the backplane, and the terminator on the rear side of the backplane is removed. The telecommunication traffic for the line card is taken off of protected mode status, and the line card resumes normal operation.

17 Claims, 6 Drawing Sheets

METHOD AND APPARATUS FOR REPLACING TERMINATOR IN THE BACKPLANE OF A TELECOMMUNICATION SWITCH

FIELD OF THE INVENTION

This invention relates to a method and apparatus for replacing a defective terminator located on a backplane in a telecommunication switch without re-routing the communication traffic on the line card. Specifically, this invention allows telecommunication switch operators to attach a unique terminator on the rear side of the backplane to avoid re-routing traffic on the line card.

BACKGROUND

In a typical telecommunication office having a telecommunication switch, a backplane is connected to the switch with slots containing numerous line cards. Each of the line cards is capable of handling telecommunication traffic and acts as the interface between the telephone or trunk line and the switching modules. The line cards are located and positioned in slots on the backplane and have a terminator connected on the front side of the backplane. If the terminator is removed, all of the telecommunication traffic on that line card is dropped, causing a disruption in service. Therefore, before a backplane terminator can be replaced, the telecommunication traffic carried on the line card must first be first routed to another line card. The routing of the telecommunication traffic to another line card and re-routing the traffic back to the line card after the terminator is replaced can often take several hours. In a typical telecommunication switch, replacing a terminator on several hundred line cards could take hundreds of hours.

Terminators are sometimes replaced during preventative maintenance on the switch. In many instances, the voltage across the pins connecting the circuitry of the terminator drops to a sufficiently low level triggering an alarm on the switch. When this occurs, an alarm is generated indicating to a switch operator that a terminator is failing. However, the alarm does not indicate the defective terminator. Usually, the alarm signals the shelf having the defective terminator. Next, the switch operator manually tests the voltage drop across the pins of the terminators associated with each line card of shelf. Upon finding the terminator with the low voltage drop, the operator marks the terminator indicating the low voltage and the terminator associated with the previous line card. Because the identification of the defective terminator is not handled by the software on the switch, identification of the defective terminator is often accomplished on a trial and error basis.

Therefore, a need exists for replacing a terminator without having to re-route the telecommunication traffic to another line card. By removing the requirement for re-routing the traffic carried on a line card having a defective terminator, a significant amount of switch operator labor savings can be achieved.

SUMMARY

This invention provides a methodology for efficiently replacing terminators on the backplane of a telecommunication switch such that the telecommunication traffic carried on the line card associated with the terminator being replaced not dropped or does not require a re-routing of the traffic to another line card by the switch operator. Using this methodology, the switch operator can save a significant amount of time when a terminator needs to be replaced due to routine maintenance or when a faulty terminator has outlived its useful life. Typically, the terminators for the line cards are located on the front side of the backplane. The telecommunication traffic carried by the line card is typically switched to protected status prior to replacing the terminator on the front side of the backplane. A terminator having a mirror image of electronic circuitry of the terminator being replaced is attached to the pins located on the rear side of the backplane. The line card is removed, and the terminator on the front side of the backplane is replaced. The line card is inserted back into the slot on the backplane, and the terminator on the rear side of the backplane is removed. The telecommunication traffic for the line card is taken off of protected mode status, and the line card resumes normal operation. This methodology allows for the replacement of a backplane terminator without a switch operator having to re-route the telecommunication traffic of the line card.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
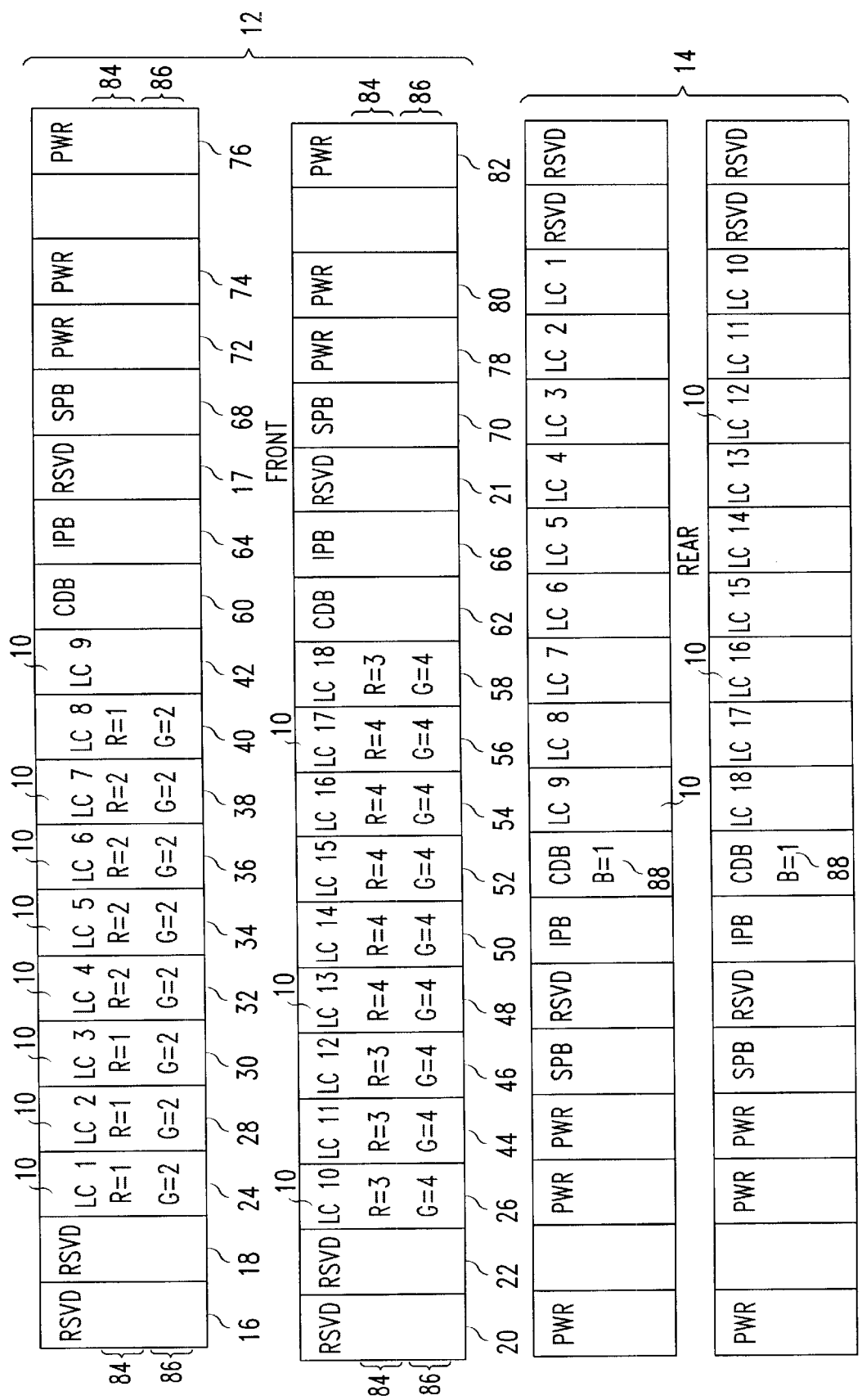
FIG. 1 illustrates the prior art location of line cards in the slots of the backplane.

FIG. 1 illustrates the prior art location of line cards in the various slots in one shelf of the backplane. Typically, the backplane has multiple shelves of line cards connecting the line cards to the switching fabric of the switch. A line card is a circuit card that serves as an interface between the telephone line such as T1, E1, Primary Rate Interface (PRI), or leased line (X.21 or V.35) service and the switching fabric of the telecommunication switch. Typically, the backplane of a telecommunication switch can support numerous line cards with each line card having one or more interfaces. These interfaces allow users to access the telecommunication network and establish either point-to-point or point-to-multipoint connections.

A slot on the backplane provides the physical and electrical connection between a line or circuit card and telecommunication switch's system resources. A typical switch has multiple slots for line cards. FIG. 1 illustrates a typical arrangement of line cards on a shelf in the backplane of a switch. The shelf of a backplane has front (12) and rear (14) sides. The backplane illustrated in FIG. 1 has thirty-eight

(38) positions for supporting line cards and circuit boards. When viewed from the front (12), the slots for the line cards may be are arranged in the following order. The three positions on the upper shelf (16), (17) and (18) and positions (20), (21) and (22) on the lower shelf are reserved. Slot 1 (24) and slot 17 (26) are reserved for the protection pack line cards, while slot 2 (28), slot 3 (30), slot 4 (32), slot 5 (34), slot 6 (36), slot 7 (38), slot 8 (40), and slot 9 (42) are reserved for line cards 1, 2, 3, 4, 5, 6, 7 and 8, respectively. Slot 18 (44), slot 19 (46), slot 20 (48), slot 21 (50), slot 22 (52), slot 23 (54), slot 24 (56), and slot 25 (58) are reserved for line cards 11, 12, 13, 14, 15, 16, 17 and 18, respectively. Slot 10 (60) and slot 26 (62) are reserved for the clock distribution boards. Slot 11 (64) is reserved for the copy 0 internal protection board (IPB) and slot 27 (66) is reserved for the copy 1IPB. Slot 12 (68) and slot 28 (70) are reserved for the satellite processor boards (SPB). Slots 13 (72), 14 (74), 15 (76) and 29 (78), 30 (80) and 31 (82) are reserved for the power packs.

Each of the line cards LC1–LC18 has two terminations—one for the receiving signal (84) and one for the transmitting signal (86). In a typical operating environment, the receiving terminators (84) are labeled in the color red and the transmitting terminators (86) are labeled in the color green. The colored labels could be any color but are used to visually distinguish between the different types. The bottom portion of FIG. 1 illustrates the rear side (14) of the backplane. The rear side has a similar configuration as the front side, but has two blue labeled terminators (88) corresponding to terminators relating to power on the backplane.

Figure 2:
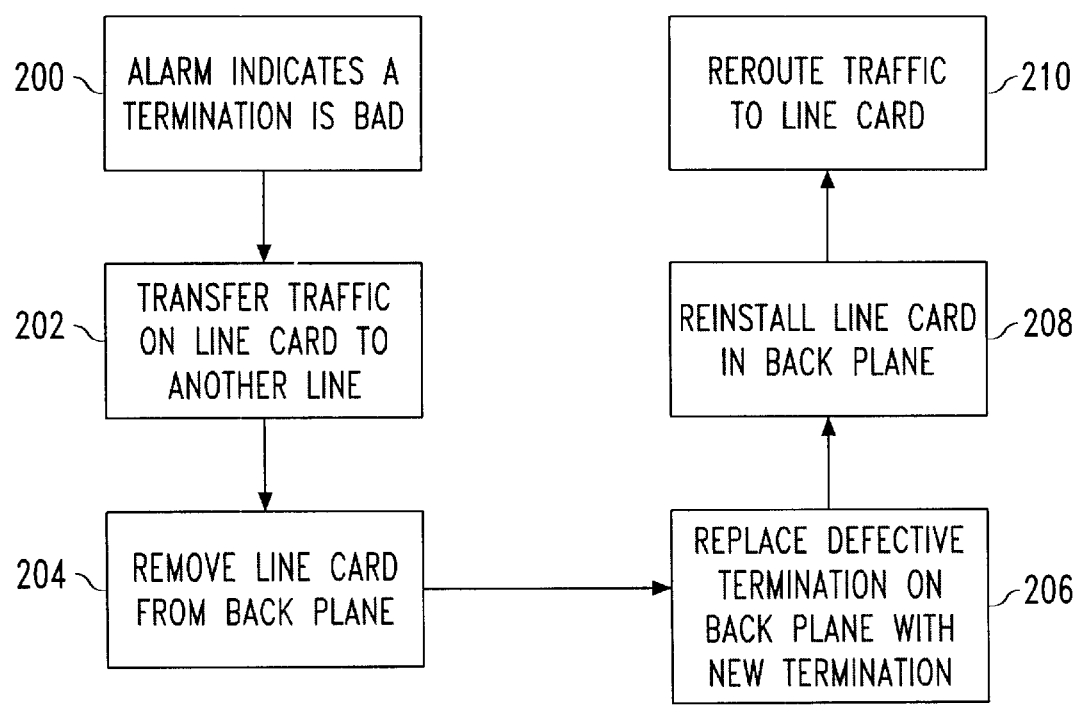
FIG. 2 illustrates the prior art method of replacing a backplane terminator.

FIG. 2 illustrates the prior art method of replacing a line card terminator. When the voltage across a terminator drops to a preselected level, an alarm (200) in the switch is triggered. This alarm (200) identifies the shelf in the backplane containing the faulty terminator, but does not identify the particular line card associated with the faulty terminator. Typically, the faulty terminator is manually isolated by a switch operator's taking manual voltage drop readings on each slot in that backplane having a line card. Once the faulty terminator is identified, the switch operator transfers the telecommunication traffic carried on the line card with the faulty terminator to another line card (202). Re-routing the telecommunication traffic to another line card (202) transfers all telecommunication traffic from the line card having the faulty terminator to another, properly functioning line card.

The line card having the faulty terminator can then be removed from the backplane 204 and the faulty terminator replaced 206. The line card is then re-installed into the backplane 208 and the telecommunication traffic is re-routed back to the original line card 210. A disadvantage to this method is that it may take several hours to route the telecommunication traffic off the line card having the faulty terminator and re-route the traffic back to the line card after the faulty terminator is replaced.

Figure 3:
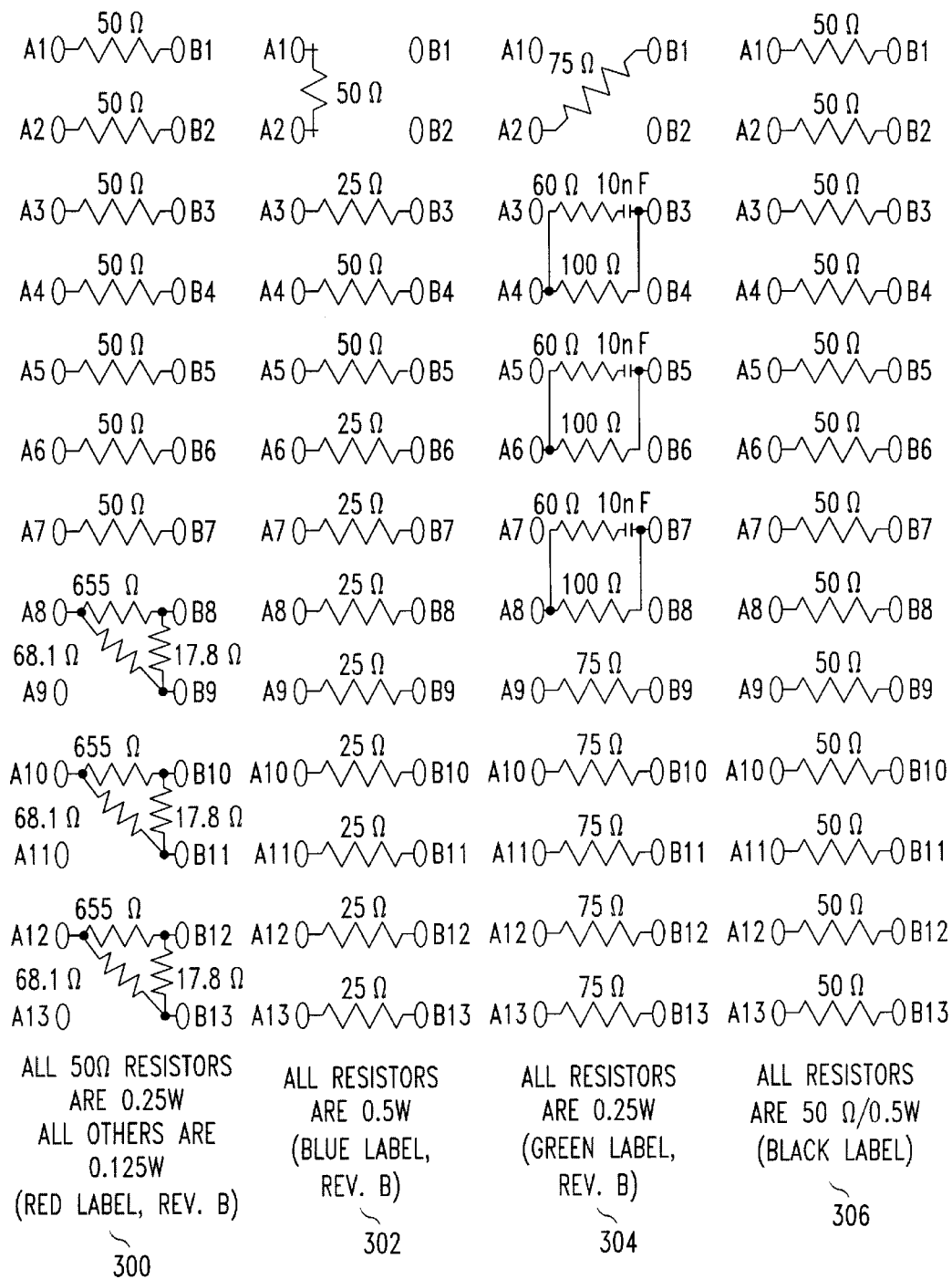
FIG. 3 illustrates the prior art electronic schematic of the prior art backplane terminator.

FIG. 3 illustrates a prior art electronic schematic of a typical terminator for use on the backplane of a telecommunication switch. The layout of the pins on the backplane, the signals carried on the pins, and the corresponding circuitry on the terminator are dependent upon the backplane original equipment manufacturer (OEM). In a typical telecommunication backplane, four types of terminators may be used. Usually, the terminators may be color coded so that the switch operators can quickly identify them. In a typical coloration scheme, the red labeled terminators 300 identify terminations on the transmit part of the backplane, while the green labeled terminators 304 identify terminations on the receiver part of the backplane. The blue labeled terminators 302 identify terminations on the power part of the backplane. The black label terminators 306 identify terminations on the matrix of the backplane.

Figure 4:
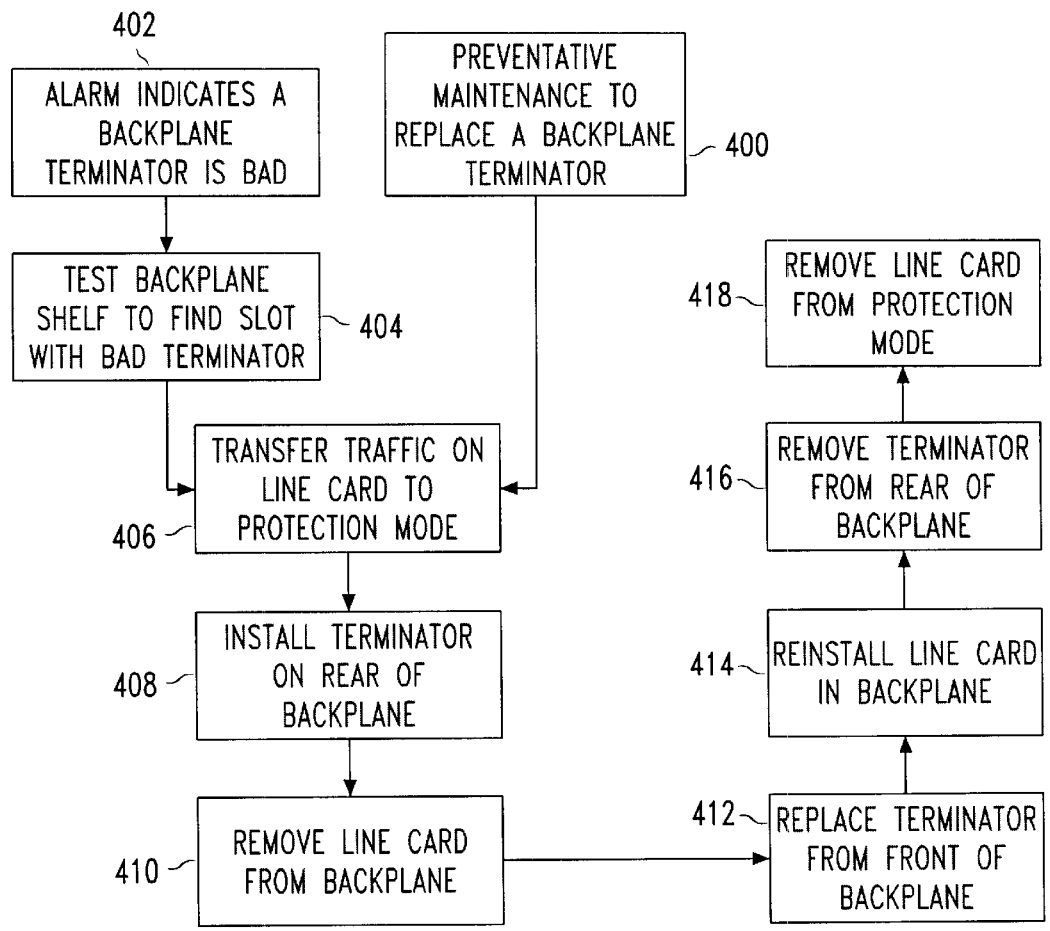
FIG. 4 illustrates one embodiment of steps of the method of the replacing a backplane terminator without re-routing traffic on the line card in accordance with the present invention.

FIG. 4 illustrates one embodiment of the steps of the method of the replacing a backplane terminator without re-routing traffic on the line card in accordance with the present invention. The terminator may be replaced as part of a preventive maintenance program 400 or in response to an alarm on the backplane or telecommunication switch indicating that the voltage carried on the terminator has dropped to a predetermined level 402. Typically, when an alarm is triggered, the alarm may indicate the terminator that is experiencing the low voltage drop, or the alarm may only indicate the shelf on the backplane having the terminator in question. The faulty terminator may be identified by the switch operator individually testing 404 each terminator on the backplane shelf corresponding to the alarm.

Once the terminator has been identified, the switch operator transfers the telecommunication traffic carried on the line card corresponding to the faulty terminator to another line card located on the backplane 406. This second line card may be one specifically designated as a backup line card and the when the traffic on a particular line card is place in protection mode, the traffic is automatically transferred to the backup line card. A terminator having a mirror image of the circuitry for the faulty terminator (see FIG. 6) is installed on the rear side of the backplane 408. This allows the traffic that is being carried on the backup line card to continue moving through the backplane uninterrupted when the line card corresponding to the faulty terminator is removed.

In addition to replacing faulty terminators or replacing terminators as part of routine, periodic maintenance, this method may be used to replace faulty line cards or those being replaced as part of the routine, periodic maintenance program.

Next, the line card corresponding to the faulty terminator is removed from the backplane 410 to allow the switch operator access to the faulty terminator. The faulty terminator is then replaced on the front side of the backplane 412 and the line card is reinstalled into the backplane 414. The terminator that was previously installed on the rear side of the backplane is removed 416 and the telecommunication traffic that was routed to another line card and placed in protected mode is removed from protected mode status, allowing the traffic to automatically move back on the original line card 418.

Figure 5:
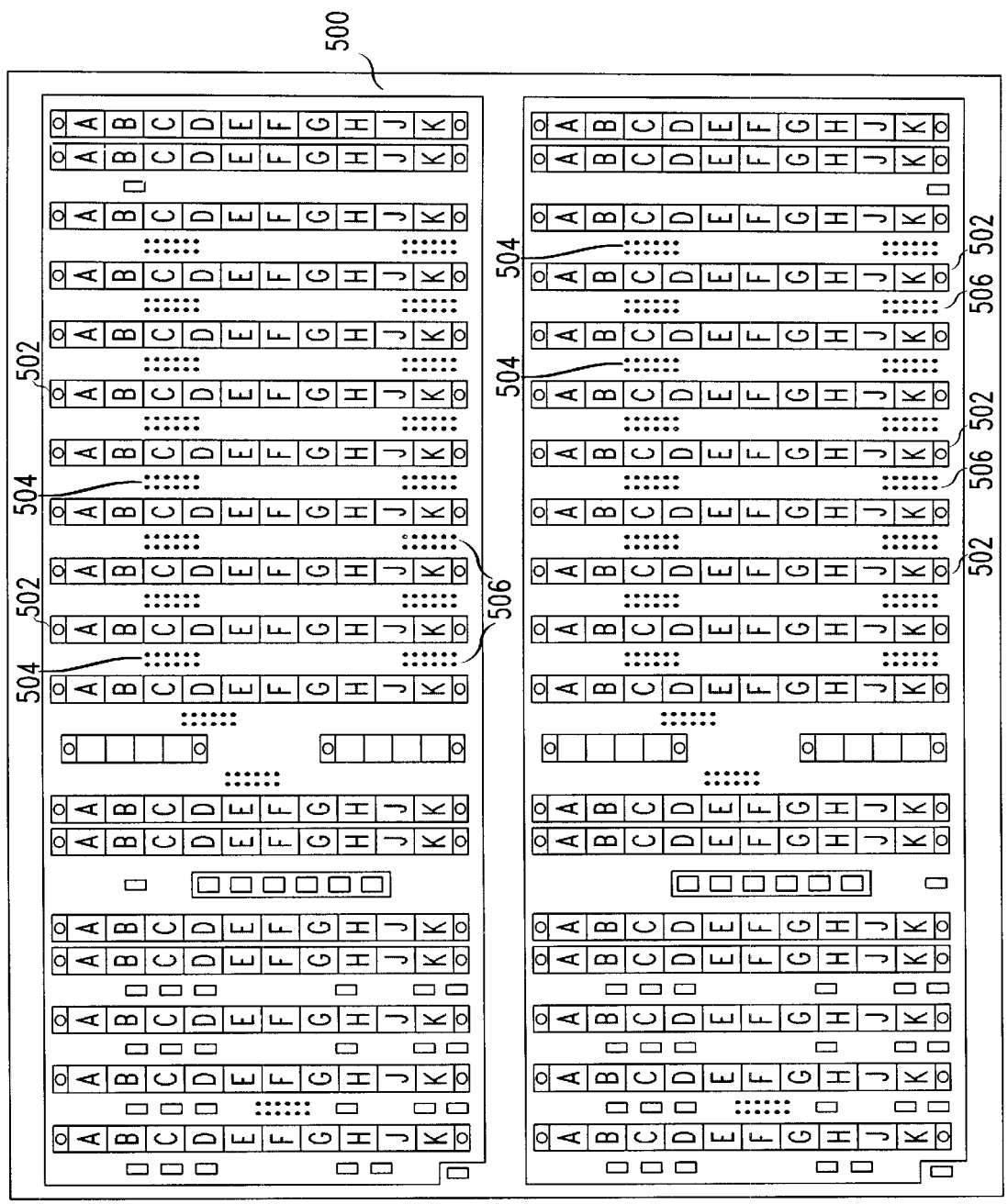
FIG. 5 illustrates one embodiment of the location of the terminators on the rear side of the backplane.

FIG. 5 illustrates one embodiment of the location of the terminators on the rear side of the backplane in accordance with the present invention. In a backplane 500, the line cards 502 are installed in slots in the backplane 500. Pins corresponding to the transmit portion of the line card 504 and pins corresponding to the receive portion of the line card 506 are visible on the rear side of the backplane 500. These pins 504 and 506 are the locations for installation of the mirror image circuitry for the temporary terminators used in the terminator replacement scheme.

Figure 6:
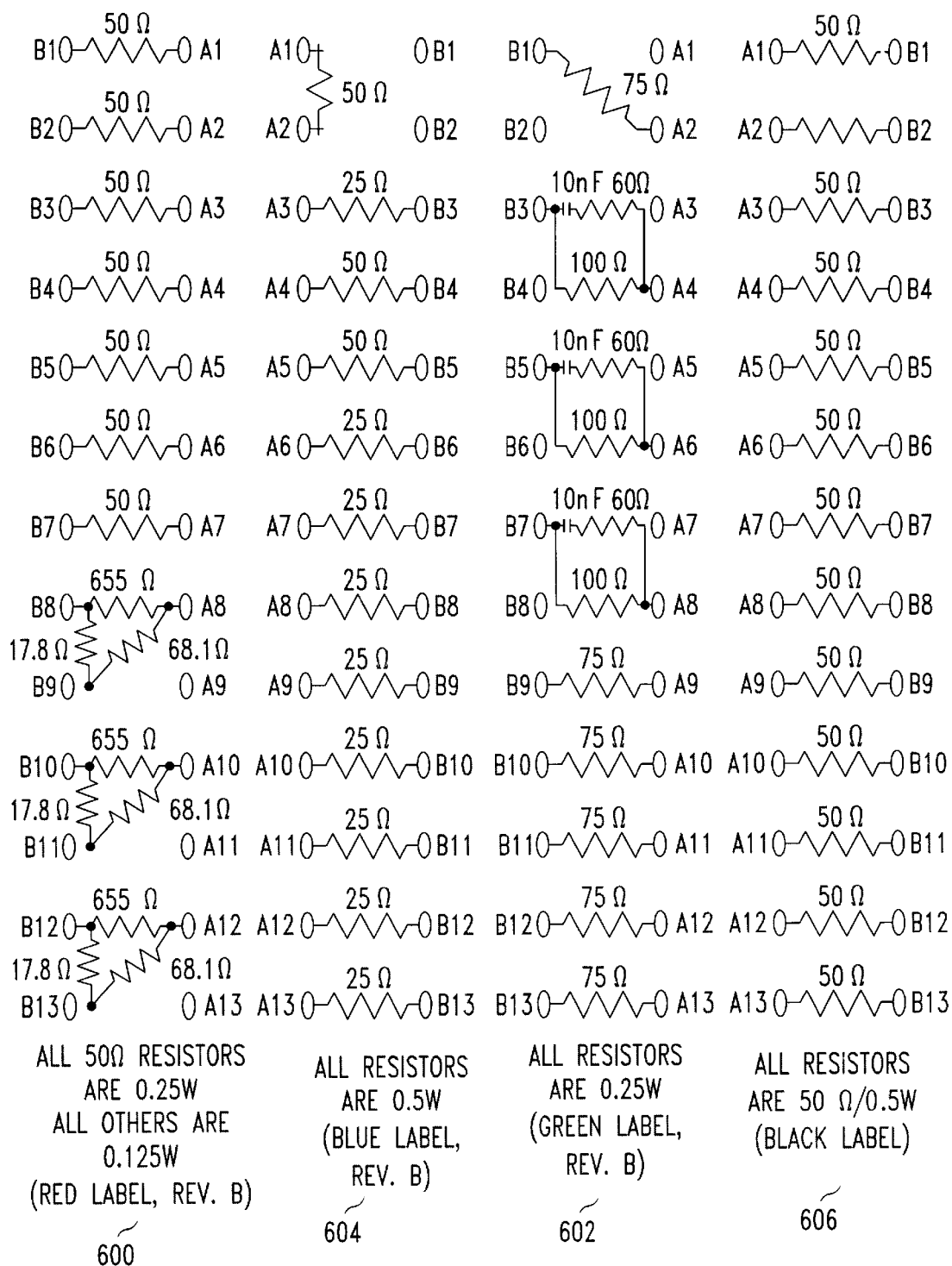
FIG. 6 illustrates one embodiment of an electronic schematic of the terminators used on the rear side of the backplane in accordance with the present invention.

FIG. 6 illustrates the electronic schematic of the terminators used on the rear side of the backplane. The circuitry for the transmit 600 and receive 602 terminators that are used on the rear side of the backplane have a mirror image of the terminators that are used on the front side of the backplane. The power terminators 604 and 606 are the same for the rear side of the backplane as the front side of the backplane and are not replaced as a part of this methodology.

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

I claim:

1. A method for changing a terminator on a backplane of a telecommunication switch, comprising the steps of:

installing a first terminator on a rear side of the backplane associated with a first line card having a second terminator;

removing the line card associated with the second terminator;

removing a second terminator on a front side of the backplane;

installing a third terminator on the front side of the backplane;

installing a second line card in the backplane; and removing the first terminator from the rear side of the backplane.

2. The method according to claim 1, further comprising the step of selecting a protect mode for traffic carried on the first line card prior to removing the first line card from the slot.

3. The method according to claim 1, further comprising the step of identifying the slot with the second terminator by testing a plurality of pins located on the rear side of the backplane.

4. The method according to claim 3, wherein the testing of the plurality of the pins located on the rear side of the backplane is performed by measuring a voltage drop across the plurality of the pins.

5. The method according to claim 3, wherein the second line card is the first line card.

6. The method of claim 1, wherein the second and third terminators have a same circuitry.

7. The method of claim 1, wherein the first terminator has a mirror image of circuitry for the second terminator.

8. A method for changing a terminator on a backplane of a telecommunication switch, comprising the steps of:

selecting a protect mode for telecommunication traffic carried on a line card located in a slot on the backplane;

installing a first terminator on a first plurality of pins corresponding to the slot in a rear side of the backplane;

removing the line card from the slot in the backplane;

removing a second terminator from a second plurality of pins in a front side of the backplane corresponding to the line card;

installing a third terminator on the second plurality of pins in the front side of the backplane;

installing the line card in the slot on the backplane;

removing the first terminator from the first plurality of pins in the rear side of the backplane; and deselecting the protect mode for the telecommunication traffic carried on the line card.

9. The method of claim 8, further comprising the step of removing the second terminator from the second plurality of pins in the front side of the backplane as part of a periodic maintenance program.

10. The method of claim 8, further comprising the step of removing the second terminator from the second plurality of pins in the front side of the backplane when the second terminator is identified as faulty.

11. The method of claim 10, wherein the second terminator has a mirror image of circuitry for the first terminator.

12. The method of claim 8, wherein the first terminator has a mirror image of circuitry for the second terminator.

13. The method of claim 8, wherein the second and third terminators have a same circuitry.

14. A method for changing a terminator on a backplane of a telecommunication switch, comprising the steps of:

responding to an alarm indicating a low voltage on a first terminator in a backplane;

identifying a slot in the backplane associated with the first terminator experiencing the low voltage;

selecting a protect mode for telecommunication traffic cared on a line card associated with the first terminator experiencing the low voltage;

installing a second terminator in a rear side of the backplane corresponding to the line card;

removing the line card from the slot in the backplane;

removing the first terminator from a front side of the backplane;

installing a third terminator in the front side of the backplane;

installing the line card in the slot in the backplane;

removing the second terminator from the rear side of the backplane; and deselecting the protect mode for the telecommunication traffic carried on the line card.

15. The method of claim 14, wherein the first and third terminator have a same circuitry.

16. An apparatus for efficiently replacing a terminator on a backplane of a telecommunication switch where a protected mode has been selected for telecommunication traffic carried on a line card located in a slot on the backplane, comprising a second terminator having disconnectable connections arranged to be connected to a first plurality of pins, for installing the second terminator on the first plurality of pins corresponding to the slot in a rear side of the backplane to permit removing the line card from the slot in the backplane and to permit removing the first terminator from a second plurality of pins in a front side of the backplane corresponding to the line card to allow installation of a third terminator on the second plurality of pins in the front side of the backplane and installation of the line card in the slot on the backplane, wherein the disconnectable connections facilitate removing the first terminator from the first plurality of pins in the rear side of the backplane prior to deselecting the protect mode for the telecommunication traffic carried on the line card.

17. A backplane for a telecommunication switch comprising:

at least one slot for accommodating a line card;

at least one first set of pins on a first surface of the blackplane;

at least one first termination device for releasable connection to the first set of pins; at least one second set of pins on a second surface of the backplane; wherein the releasbale connection provided by said first set of pins facilitates removal the first terminator from the backplane prior to deselecting a protect mode for the telecommunication traffic carried on the line card; and at least one second termination device for releaseable connection to the second set of pins.

* * * * *